United States Patent [19]

Takeshita et al.

[11] Patent Number: 4,693,813

[45] Date of Patent: Sep. 15, 1987

[54] METHOD OF BROACHING OUTER PERIPHERY OF LOBE-TYPE ROTOR OF ROOTS-TYPE FLUID MACHINE, AND BROACHING CUTTER USED IN THE METHOD

[75] Inventors: Hajime Takeshita, Toyota; Takahiro Iwase, Anjyo; Naofumi Masuda, Nagoya; Takuo Sibata, Okazaki; Hiroyuki Mochizuki, Aichi; Nobuo Kobayashi, Toyota; Seiho Kawakami, Toyota; Yosio Kuroiwa, Toyota, all of Japan

[73] Assignee: Toyota Jidosha Kabushiki Kaisha, Toyota, Japan

[21] Appl. No.: 890,630

[22] Filed: Jul. 30, 1986

[30] Foreign Application Priority Data

Jul. 30, 1985 [JP] Japan ................................ 60-117516
Jul. 31, 1985 [JP] Japan ................................ 60-117547

[51] Int. Cl.[4] ........................................ B23D 15/02
[52] U.S. Cl. ........................................ 409/244; 29/23.5;
29/156.8 CF; 407/19; 409/268; 409/293;
409/310; 409/319
[58] Field of Search ............... 409/244, 259, 260, 268,
409/293, 310, 313, 319, 131, 132; 29/23.5, 156.8
CF; 407/19

[56] References Cited

U.S. PATENT DOCUMENTS 4,512,066 4/1985 McCullough ..................... 29/23.5
4,595,349 6/1986 Preston et al. .......... 29/156.8 CF X

FOREIGN PATENT DOCUMENTS 5492405 12/1952 Japan .

OTHER PUBLICATIONS

B. Wiedemann, SAE Technical Paper Series (Development of Volkswagen's Supercharger G-Lader), Feb. 24-28, 1986.

Primary Examiner—Z. R. Bilinsky
Attorney, Agent, or Firm—Oblon, Fisher, Spivak, McClelland & Maier

[57] ABSTRACT

A broaching method for finishing an outer peripheral surface of a resin layer of a resin-coated lobe-type rotor for a rotary fluid machine of a Roots type, which includes the steps of forming, with a leading grooving cutter, at least one chip-breaker groove in the outer peripheral surface of the resin layer, such that the chip-breaker groove extends in a broaching direction parallel to an axis of rotation of the rotor. The method further includes the steps of finishing at least a portion of the outer peripheral surface of the resin layer with a trailing finish cutter having a cutting edge contour corresponding to the portion of the outer peripheral surface of the resin layer, which is finished by the finish cutter after the chip-breaker groove is formed therein by the grooving cutter. A composite broach or formed broach having the grooving and finish cutters is fed such that the grooving cutter leads the finish cutter in the broaching direction.

7 Claims, 17 Drawing Figures

METHOD OF BROACHING OUTER PERIPHERY OF LOBE-TYPE ROTOR OF ROOTS-TYPE FLUID MACHINE, AND BROACHING CUTTER USED IN THE METHOD

BACKGROUND OF THE INVENTION

1. Field of the Art

The present invention relates generally to a method of manufacturing a lobe-type rotor of a rotary fluid machine of a Roots type, and more particularly to a method of broaching the outer surface of the rotor to a desired finish profile, and a broach unit or cutter used in the broaching method.

2. Brief Discussion of Related Art

In a rotary fluid machine of a Roots type such as rotary lobe-type pump or air compressor or blower, two lober or roters mounted on parallel shafts are received in a hollow housing and are operatively connected to each other by timing gears located at one end of each parallel shaft, so that the two rotors are rotated in opposite directions with a proper relation maintained therebetween. Generally, it is important to minimize the clearance or gap between the peripheries of the lobe-type rotors, for maximum discharge or displacement efficiency. To this end, it is desirable that an outer surface of a resin layer covering the external surface of the core member of each rotor be accurately finished to the intended profile. To finish the outer periphery of the resin-coated rotor with high efficiency, a broaching method is commonly practiced to profile the outer surface of the resin layer over a relatively large area in a single pass of a broach having a formed cutting edge corresponding to the surface to be broached. In this case, however, a chip produced by the formed broach cutter tends to be continuous, causing a comparatively high cutting resistance to the broach cutter, and consequent inconveniences such as local or partial separation, flake-off or peel-off of the resin layer from the core member of the rotor, and/or breakage or other damage to the broach cutter.

To reduce the cutting resistance, it has been proposed to use a combination or composite broach unit as indicated generally at 18 in FIG. 14. This broach unit includes a slide 10, and two cutters 14, 16 which are mounted on the slide 10 such that the cutters 14, 16 are spaced apart from each other in a direction of movement of the slide 10, i.e., in the direction parallel to the axis of rotation of a lobe-type rotor 12 to be finished by the broach unit 18. The two cutters 14, 16 have cutting edges whose contours cooperate to define a portion of the outer periphery of the rotor to be broached. Further, the two cutters 14, 16 have a plurality of chip-breaker recesses 20, 21 which are formed in the broaching direction and spaced apart from each other along the surface of the rotor 12 to be broached. Each recess 21 is disposed between the adjacent two recesses 20, in the direction along the surface of the rotor 12.

The above broaching method utilizing two formed cutters sin advantageous in terms of ease of chip removal, owing to the presence of the chip-breaker recesses 20, 21, which function is to break the produced chip into small segments and thereby eliminate the possibility of flake-off or peel-off of the resin layer of the rotor 12. In the proposed broaching method, projections 22 are left uncut, as shown in FIG. 15, due to the presence of the chip-breaker recesses 20 in the lower or leading cutter 14. These projections 22 which extend in the broaching direction, are subsequently removed by the upper or trailing cutter 16, as indicated in FIG. 16. However, the projections 22 are left unremoved as raised portions 24, due to a slight misalignment of the lower and upper cutters 14, 16 relative to each other, or due to a difference in the amount of grinding for sharpening the cutting edges of the two cutters 14, 16. Further, raised portions 25 may be left due to the presence of the chip-breaker recesses 21 formed in the upper cutter 16, as indicated in FIG. 17. Thus, the proposed broaching method and composite broach unit are characterized by unsatisfactory smoothness of the finished surface of the rotor 12. The above-indicated inconveniences become increasingly severe as the broaching area of the cutters 14, 16 is increased, and as the cutting edge profiles of the cutters 14, 16 become complicated.

SUMMARY OF THE INVENTION

It is accordingly an object of the present invention to provide a broaching method by which an outer surface of a resin-coated lobe-type rotor for a rotary fluid machine of a Roots type is accurately and efficiently finished to a desired profile, without flake-off or other defects of the finished surface, and/or damage to a broaching tool.

To achieve the above object according to the present invention, there is provided a broaching method for finishing an outer peripheral surface of a resin layer of a resin-coated lobe-type rotor for a rotary fluid machine of a Roots type, comprising the steps of: (a) forming, with a leading preliminary cutter, at least one chip-breaker groove in the outer peripheral surface of the resin layer, such that the at least one chip-breaker groove extends in a broaching direction parallel to an axis of rotation of the rotor; and (b) finishing, with a trailing finish cutter, at least a portion of the outer peripheral surface of the resin layer which corresponds to a part of an entire periphery of the rotor and which has the at least one chip-breaker groove. The finish cutter has a cutting edge contour corresponding to the above-indicated part of the entire periphery of the rotor. The above-indicated portion of the outer peripheral surface of the resin layer is finished by the finish cutter after the at least one chip-breaker groove is formed therein by the preliminary cutter.

In the broaching method of the present invention described above, the chip-breaking groove or grooves which are formed in the outer surface of the resin layer prior to the finishing cut by the finish cutter effectively serve to break the chip produced by the finish cutter into segments or pieces which tend to be curled or wound, and are easily removed, whereby the finish cutter may accomplish a smooth finish broaching cut with a reduced cutting resistance, and without damaging the finished surface of the resin layer or the finish cutter. Further, since the finish cutter has a cutting edge contour identical with the desired profile of the part of the outer periphery of the resin-coated lobe-type rotor, any raised portions created due to chip-breaker recesses as provided in the conventional broach cutters will not be left on the finished surface of the rotor. Thus, the resin-coated lobe-type rotor may be smoothly and accurately finished, accordding to the present broaching method. Further, the present method permits easier positioning of the preliminary and finish cutters relative to each other, as compared with the conventional method wherein the two finish cutters each having a plurality of chip-breaking recesses cooperate to define a desired finish profile of the rotor, that is, each cutter performs a finishing cut.

According to one feature of the present method, the preliminary and finish cutters are fed concurrently in the broaching direction in spaced-apart relation with each other in the broaching direction. In this case, the preliminary and finish cutters may be mounted on a slide such that the preliminary cutter leads the finish cutter in the broaching direction. The two cutters are fed concurrently by moving the slide in the broaching direction.

According to another feature of the invention, the at least one chip-breaker groove is formed by corresponding at least one grooving tooth formed in the preliminary cutter.

According to a further feature of the invention, the at least one chip-breaker groove consists of a plurality of grooves which are spaced apart from each other in a direction along the periphery of the rotor.

In accordance with a still further feature of the invention, the at least one chip-breaker groove is V-shaped in traverse cross section.

In accordance with yet another feature of the method of this invention, the depth of the at least one chip-breaking groove is substantially equal to an amount of stock removed by the finish cutter.

Another object of the invention is the provision of a combination or composite broach unit suitably used to practice the broaching method of the invention.

According to another aspect of the invention, the above object is attained by a composite broach unit for broaching an outer peripheral surface of a resin layer of a resin-coated lobe-type rotor of a rotary fluid machine of a Roots type, comprising: (a) a leading preliminary cutter having at least one grooving tooth for forming at least one chip-breaker groove in the outer peripheral surface of the resin layer, the at least one grooving tooth extending in a broaching direction parallel to an axis of rotation of the rotor; (b) a trailing finish cutter for finishing the outer peripheral surface of the resin layer, the finish cutter having a cutting edge contour corresponding to at least a part of an entire outer periphery of the rotor; and (c) support means for supporting the preliminary and finish cutters such that the preliminary cutter leads the finish cutter in the broaching direction.

According to one feature of the broach unit of the invention, the support means comprises a slide movable in the direction. The preliminary and finish cutters are mounted on the slide such that the preliminary and finish cutters are spaced apart from each other in the broaching direction.

According to another feature of the broach unit of the invention, the preliminary cutter has a plurality of grooving teeth which are spaced apart from each other in a direction along the portion of the entire periphery of the rotor to be finished by the finish cutter.

In accordance with a further feature of the instant broach unit, the height of the at least one grooving tooth is not greater than an amount of stock removed by the finish cutter.

A further object of the invention is the provision of a formed broach suitably used to practice the broaching method of the invention.

This object is achieved by a formed broach construed according to a further aspect of the invention, for broaching an outer peripheral surface of a resin layer of a resin-coated lobe-type rotor of a rotary fluid machine of a Roots type, by a broaching movement of the formed broach relative to the outer peripheral surface in a broachiing direction parallel to an axis of rotation of the rotor, the formed broach comprising: a leading grooving portion including at least one grooving tooth which has a cutting edge for forming at least one chip-breaker groove in the outer peripheral surface of the resin layer, such that the at least one groove extends in the broaching direction; and a trailing finishing portion for finishing the outer peripheral surface of the resin layer after the at least one chip-breaker groove is cut in the outer peripheral surface by the grooving portion. The finishing portion is formed adjacent to the leading grooving portion in the broaching direction, and has a cutting edge whose contour corresponds to at least a part of an entire periphery of the rotor. The grooving and finishing portions are formed such that a distance between the cutting edge of the finishing portion and the axis of rotation of the rotor is equal to a distance between the cutting edge of the grooving portion and the axis of rotation.

The formed broach constructed as described above has a comparatively small dimension between the grooving and finishing portions in the broaching direction. That is, the finishing portion is spaced a relatively short distance away from the grooving portion when the grooving portion starts a grooving cut on the rotor, and the grooving portion is spaced a relatively short distance away from the finishing portion when the finishing portion has terminated a finishiing cut on the rotor. Accordingly, the instant formed broach requires relative small spaces above and below the rotor, and consequently it is possile to reduce dimensions of holder members of a clamping jig which supports or clamps the rotor at its opposite ends. Hence, the rigidity of the clamping jig is increased, and therefore the broaching accuracy is improved. Further, the comparatively small dimension between the grooving and finishing portions of the formed broach means relatively reduced overall size and mass of the broach itself, as well as relatively reduced size and mass of the clamping jig. Accordingly, the equipment cost for broaching the rotor is reduced.

Further, since the grooving and finishing portions are formed adjacent to each other, and since the distance of the grooving cuting edge from the axis of rotation of the rotor is equal to that of the finishing cutting edge, these grooving and finishing portions may be easily formed simultaneously, as by a wire-cut EDM (electro-discharge machining). This results in a reduced cost of manufacture of the formed broach. Moreover, the instant formed broach permits the rotor to be broached without the chip-breaker groove or grooves partially left in the finished surface or the resin layer, namely, the bottom of the grooves formed by the grooving portion is exactly aligned with the surface of the resin layer finished by the finishing portion.

According to one feature of the formed broach of the invention, the leading grooving portion has a plurality of grooving teeth which are spaced apart from each other in a direction along the portion of the entire periphery of the rotor to be finished by the trailing finishing portion.

According to another feature of the formed broach, the contour of the cutting edge of the leading finishing portion corresponds to the entire periphery of the rotor. In this case, the cutting edge of the trailing finishing portion may be provided as an edge which defines one of opposite open ends of an aperture formed through a generally planar member in the broaching direction, the aperture having a profile corresponding to the entire periphery of the rotor, the at least one grooving tooth extending from the edge of the aperture in the broaching direction.

A still further object of the invention is the provision of a broach which is suitably used to practice the broaching method of the invention, and which prevents reduction in the volumetric efficiency of the rotary fluid machine due to chip-breaker grooves partially left in the resin layer of the rotor during a broaching operation on the resin layer.

This object is attained by a broach which is constructed according to a still further aspect of the invention, for broaching an outer peripheral surface of a resin layer of a resin-coated lobe-type rotor of a rotary fluid machine of a Roots type, by a broaching movement of the formed broach relative to the outer peripheral surface in a broaching direction parallel to an axis of rotation of the rotor, the lobe-type rotor consisting of a plurality of lobes symmetrical with each other with respect to the axis of rotation of the rotor, each of the lobes having an external cross sectional profile which consists of two symmetrical curved components, the broach comprising: a trailing finishing portion for finishing the outer peripheral surface of the resin layer, the finishing portion having a cutting edge contour corresponding to at least a part of an entire periphery of the rotor; and a leading grooving portion which leads the trailing finishing portion in the broaching direction. The grooving portion has at least one grooving tooth for forming at least one chip-breaker groove in the outer peripheral surface of the resin layer, such that the at least one groove extends in the broaching direction. Each grooving tooth is positioned with respect to the part of the entire periphery of the rotor so that each of the at least one chip-breaker groove is located at a point along the corresponding one of the two symmetrical curved components of the external cross sectional profile of the corresponding lobe of the rotor, such that none of a first group of angles each of which is formed between a first straight line passing the point of said each chip-breaker groove and the axis of rotation of the rotor, and a second straight line passing the axis of rotation and one of opposite ends of the corresponding curved component of the external profile of the corresponding lobe, is equal to any one of a second group of angles each of which is formed between the first straight line and a third straight line passing the axis of rotation of the rotor and the other end of the corresponding curved component of the external profile.

In a fluid machine whose rotors are broached by the broach constructed as described above, even if the chip-breaker grooves are partially left as very shallow recesses in the finished surface of the resin layer of each rotor, the recesses in one of the two rotors will not meet the recesses in the other rotor during rotation of the rotors in engagement with each other, since the position of each grooving tooth of the broach is determined in order to avoid such meeting of the recesses left in the rotors. More specifically, the two mutually engaging rotors of the fluid machine are rotated at the same angular velocity in the opposite directions. Assuming that the two rotors are rotated by a given angle $\omega$ as measured from their angular positions at which the second straight line (as defined above) of one of the two rotors is in line with the third straight line (as also defined above) of the other rotor, a part of the peripheral surface of the above one rotor which is away from the second straight line by the above angle $\omega$ will meet a part of the surface of the other rotor which is away from the third straight line by the same angale $\omega$. Therefore, unless the chip-breaker grooves are formed in these parts of the two rotors, the grooves if partially left will not meet each other. In other words, the grooving teeth of the broached are positioned with respect to the periphery of the rotors, so that the chip-breaker grooves to be cut are not formed in the above-indicated parts of the respective symmetrical curved components of the external cross sectional profile of the lobes of the rotors.

Since the grooving teeth of the instant broach for finishing the resin layer of the rotor are positioned so as to avoid the meeting of the shallow recesses if any in the finished resin layer of the two rotors during an operation of the fluid machine, the fluid machine is effectively protected from otherwise possible reduction in its volumetric efficiency.

In one form of the broach described above, the lobe-type rotor has two lobes symmetrical with each other with respect to the axis of rotation, and the cutting edge contour of the finishing portion corresponds to the entire periphery of the rotor. In this case, the grooving portion may have eight grooving teeth so that two chip-breaker grooves are formed in each of the two symmetrical curved components of each of the two lobes.

In another form of the broach, the finishing portion has a cutting edge which is formed as an edge defining one of opposite open ends of an aperture formed through a generally planar member in the broaching direction. The aperture has a profile corresponding to the entire periphery of the rotor. Each grooving tooth is formed so as to extend from the edge of the aperture in the broaching direction.

The position of the grooving tooth of the above broach is particularly advantageous where a cutting edge of the grooving tooth is spaced a predetermined distance away from the cutting edge of the finishing portion inwardly of the periphery of the rotor in a radial direction perpendicular to the axis of rotation of the rotor. In other words, the rotors which are broached by the instant broach will not cause reduction in the volumetric efficiency of the fluid machine, even if the chip-breaker grooves are partially left in the outer peripheral surface of the resin layer which has been finished by the finishing portion of the broach.

According to the present invention, there is also provided a resin-coated lobe-type rotor of a rotary fluid machine of a Roots type, including a core member, and a resin layer covering an outer surface of the core member, the lobe-type rotor consisting of a plurality of lobes symmetrical with each other with respect to an axis of rotation of the rotor, each of the plurality of lobes having an external cross sectional profile consisting of two symmetrical curved components. The resin layer has an outer peripheral surface having at least one recess each of which consists of a bottom portion of a chip-breaker groove which is formed to facilitate removal of chips during a broaching operation to finish the outer peripheral surface, the bottom portion of each recess being left after the broaching operation. Each recess is located at a point along the corresponding one of the two symmetrical curved components of the external cross sectional profile of the corresponding lobe of the rotor, such that none of a first group of angles each of which is formed between a first straight line passing the point of each chip-breaker groove and the axis of rotation of the rotor, and a second straight line passing the axis of rotation and one of opposite ends of the corresponding curved component of the external profile of the corresponding lobe, is equal to any one of a second group of angles each of which is formed between the first straight line and a third straight line passing the axis of rotation of the rotor and the other end of the corresponding curved component of the external profile.

BRIEF DESCRIPTION OF THE DRAWINGS

The above and optional objects, features and advantages of the present invention will be better understood by reading the following detailed description of a preferred embodiment of the invention, when considered in connection with the accompanying drawings, in which.

DESCRIPTION OF THE PREFERRED EMBODIMENT

To further clarify the principle of the present invention, the preferred embodiment of the invention will now be described in detail referring to the accompanying drawings.

Figure 1:
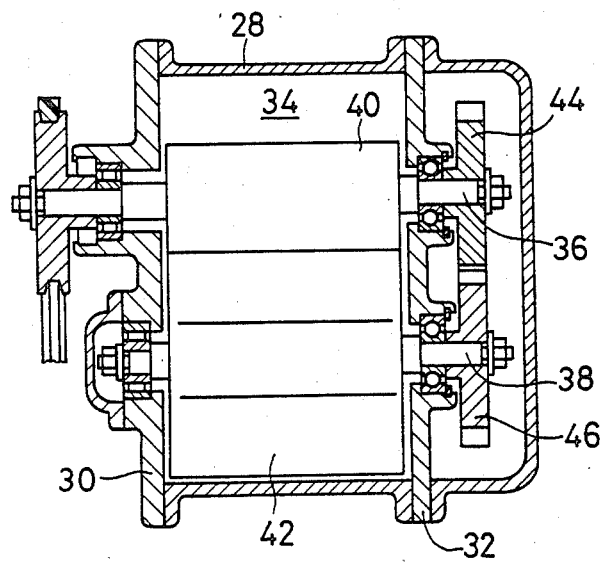
FIGS. 1 and 2 are front and side elevational views, respectively, in cross section of an example of a rotary fluid machine of a Roots type in the form of a supercharger using lobe-type rotors, to which the present invention is applicable.
Figure 2:
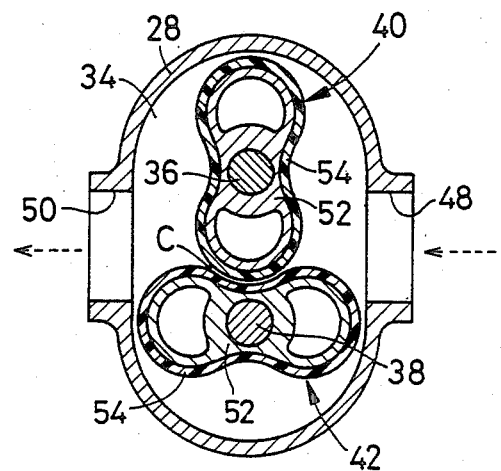

Referring first to FIGS. 1 and 2, there is shown a rotary fluid machine of a Roots type in the form of a supercharger used on an engine of an automotive vehicle to increase volumetric efficiency by forcing a greater quantity of air into the cylinders. The housing of the Roots-type supercharger consists of a hollow housing body 28, and a pair of end plates 30, 32 which closes opposite open ends of the hollow main body 28. Thus, the hollow housing body 28 and the end plates 30, 32 cooperate to define an air-tight pump chamber 34. The housing rotatably supports a pair of parallel support shafts 36, 38 which in turn support a corresponding pair of lobe-type rotors 40, 42 accommodated in the pump chamber 34. Each of the rotors 40, 42 has a transverse cross sectional shape similar to the shape of a cocoon or peanut shell, as shown in FIG. 2. The lobe-type rotors 40, 42 are coupled to each other by a pair of timing gears 44, 46 which are fixed to one end of the corresponding shafts 36, 38. The timing gears 44, 46 mesh with each other, so that the two rotors 40, 42 are rotated in the opposite directions at the same angular velocity, whereby air is sucked into the pump chamber 34 through an inlet 48 formed in the housing body 28 and the compressed air is discharged from the pump chamber 34 through an outlet 50 also formed in the housing body 28.

The lobe-type rotor 40, 42 consists of a metallic core member 52 and a resin layer 54 of a suitable thickness which covers the external peripheral surface of the core member 52. For example, the resin layer 54 is formed of a resin such as a copolymer of tetrafluoroethylene and ethylene, with a thickness ranging from about 0.3 to about 1.5 mm. The thus constructed rotors 40, 42 are finished so as to have the same external shape and dimensions by broaching an outer surface of the resin layer 54. The broaching operation will be described in connection with the rotor 40. Such description applies to the broaching operation on the rotor 42.

Figure 3:
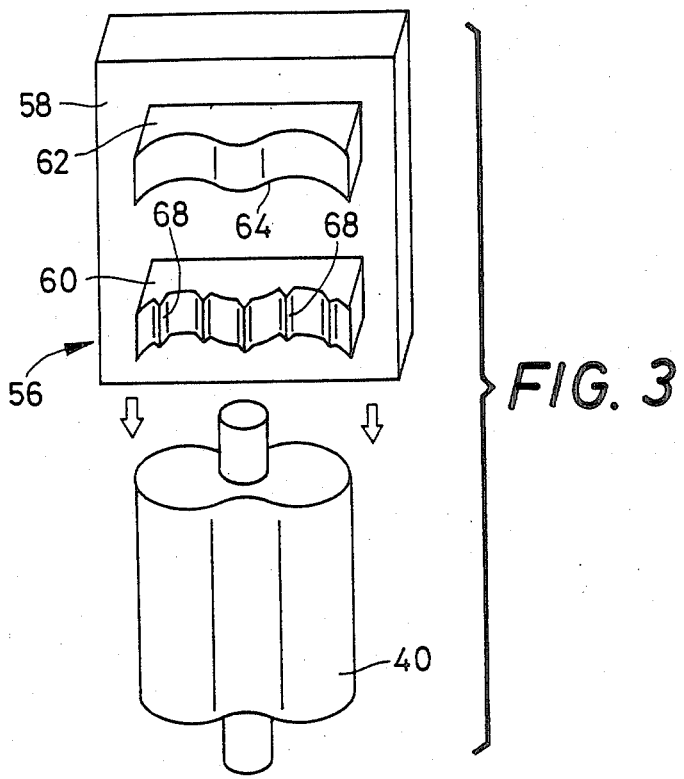
FIG. 3 is an example of a combination or composite broach unit used in one embodiment of the invention, for broaching each lobe-type rotor of the Roots pump of FIGS. 1 and 2.
Figure 4:
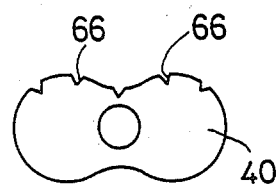
FIGS. 4 and 5 are explanatory views illustrating broaching steps of the method practiced to broach the rotor of the FIG. 3.
Figure 6:
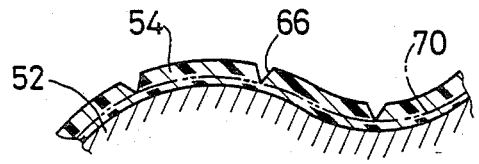
FIG. 6 is an illustration showing chip-breaker grooves formed in the external surface of the rotor, and an external finish profile of the rotor.

There is shown in FIG. 3 a combination or composite broach unit 56 which is supported so as to be slidable in a direction parallel to the axis of rotation of the rotor 40 for broaching a relatively large area of the outer surface of the resin layer 54 of the rotor 40 at one time, that is, with a single pass along the axis of the rotor 40. The composite broach unit 56 includes a slide 58, a leading preliminary cutter 60 and a trailing finish cutter 62 which are mounted on the slide 58 such that the two cutters 60, 62 are spaced apart from each other in the direction of movement of the slide 58, namely, in the broaching direction parallel to the axis of rotation of the rotor 40. With the slide being fed in the broaching direction, the preliminary cutter 60 leads the finish cutter 62. The finish cutter 62 has a cutting edge 64 having a contour identical with a corresponding portion of the desired external finish profile of the rotor 40. The preliminary cutter 60 has a plurality of grooving teeth 68 (five teeth in this specific embodiment) which extend in the broaching direction and are spaced apart from each other along the desired finish profile of the rotor 40. The grooving teeth 68 are provided to cut V-shaped grooves 66 in the outer surface of the resin later 54 to a depth corresponding to the desired finish dimension of the rotor 40, as indicated in FIGS. 4 and 6. The grooving teeth 68 therefore have a transverse cross sectional shape corresponding to the shape of the V-shaped grooves 66.

Figure 5:
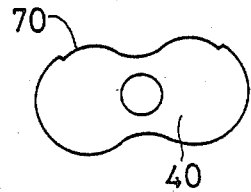

The thus constructed composite broach unit 56 is fed, and therefore the preliminary and finish cutters 60, 62 are fed concurrently in the direction indicated by arrows in FIG. 3, relative to the lobe-type rotor 40 clamped in position by suitable means. As a result, the V-shaped grooves 66 are cut in the outer surface of the resin layer 54 by the preliminary cutter 60 which leads the finish cutter 62 in the broaching direction. The outer surface in which the grooves 66 are formed is then broached by the finish cutter 62, whereby a finished surface 70 identical in cross section with the contour of the cutting edge 64 is formed as the outer surface of the broached rotor 40. Thus, the outer surface of the workpiece 40 is finished over a comparatively large area in a single pass of the composite broach unit 56, with a sufficiently high level of precision. FIGS. 4 and 5 show the external profiles of the workpiece 40 after cuts have been made by the preliminary and finish cutters 60, 62.

As indicated above, the V-shaped chip-breaker grooves 66 are formed in the skin portion of the resin layer 54 before the finish cutter 60 effects a finish broaching cut. Consequently, the chip-breaker grooves 66 act to divide the stock removed by the finish cutter 62, into small segments whose width corresponds to the spacing between the adjacent grooves 66. Accordingly, the cutting resistance to the finish cutter 62 is significantly reduced, permitting the slide 58 to be stably fed with a comparatively small driving force. Hence, the outer surface of the rotor 40 is smoothly finished without defects such as flake-off or peel-off of the resin layer 54. Further, any chip breaking portions are left unremoved on the finished surface 70, since a finish broaching cut is taken by the cutting edge 64 of the finish cutter 62, which has the cutting edge contour identical with the desired finish profile of the rotor 40. the instant arrangement does not suffer the conventionally encountered difficulty of positioning the two or more finish cutters relative to each other so as to obtain a smoothly finished surface.

Figure 7:
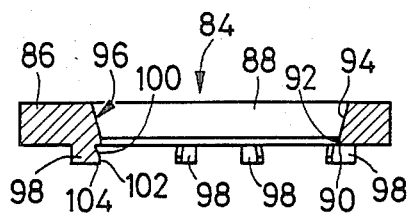
FIG. 7 is a front elevational view in cross section taken along line 7—7 of FIG. 8, showing an example of a formed broach used in another embodiment of the invention.

It is desirable that the chip-breaker V-shaped grooves 66 which are cut by the preliminary cutter 60 prior to the finish cut by the finish cutter 62 have a depth equal to an amount of stock removed by the finish cutter 62, as indicated in FIG. 7. In this instance, the stock removed by the finish cutter 62 may be easily and completely broken or divided into pieces, while at the same time the bottom portion of the grooves 66 is substantially entirely eliminated. However, it is possible that the depth of the V-shaped grooves 66 may be slightly smaller or larger than the amount of stock removal by the finish cutter 62. In the case where the depth of the grooves 66 is smaller than the depth of the finishing cut, the stock removed by the finish cutter 62 is in the form of a continuous chip consisting of segments which are defined by the adjacent grooves 66 and connected to each other at the bottom of each groove 66. However, since the thickness of the portions of the continuous chip which connect the segments is very small and the strength of these portions is very weak, the segments of the continuous chip may be easily separated from each other during the finish broaching cut. In other words, the depth of the grooves 66 must be determined dso that the stock removed by the finish cutter 62 is relatively easily broken into pieces. If the depth of the grooves 66 is slightly larger than the depth of the finish broaching cut, on the other hand, the bottom portions of the grooves 66 may be left in the finished surface 70. In this case, too, therefore, caution must be taken so that the unremoved bottom portions of the grooves 66 do not significantly affect the operation of the Roots-type rotary air compressor as the supercharger. More specifically, the maximum permissible depth of the chip-breaker grooves 66 is determined so as to avoid a decrease in the discharge efficiency of the supercharger, and undesirable defects such as flake-off of the resin layer 54.

Figure 14:
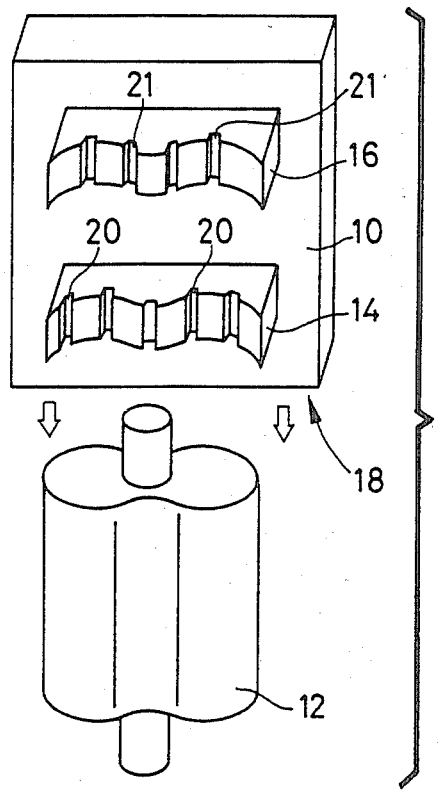
FIG. 14 is a view corresponding to that of FIG. 1 but showing a known broaching method.
Figure 15:
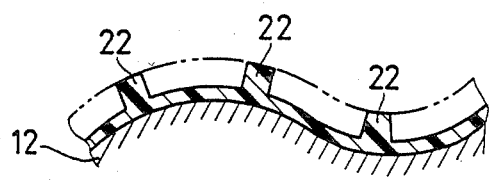
FIGS. 15-17 are illustrations indicating broaching steps of the known method of FIG. 14.
Figure 16:
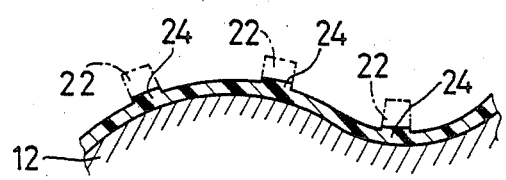
Figure 17:
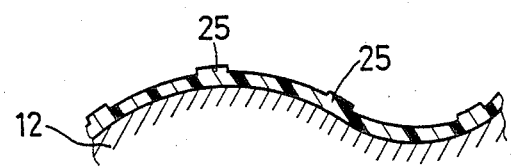

It is noted that for easy understanding, the chip-breaker recesses 20, 21, projections 22, raised portions 24, etc. shown in FIGS. 14-16, and V-shaped grooves 66, grooving teeth 68, etc. shown in FIGS. 3-6 are exaggerated in size.

While the finish cutter 62 used in the illustrated embodiment covers a portion of the periphery of the rotor 40 to be finished (as indicated in FIG. 5), it is possible to modify the finish cutter 62 so as to cover half of or the entirety of the periphery of the rotor 40 whereas the preliminary cutter 60 is used to form at least one chip-breaker groove in the outer surface of the resin layer 54 for the entire periphery of the rotor 40. However, it is preferred that the preliminary cutter 60 have a plurality of grooving teeth for providing a plurality of chip-breaker grooves for the entire periphery of the rotor 40. Namely, the number of the grooving teeth 68 or chip-breaker grooves 66 is determined depending upon the length of the outer periphery of the rotor 40, i.e., the length of the chip produced by the finish cutter 62 as measured in FIG. 5.

The grooving teeth 68 which are V-shaped in cross section may have a rectangular cross sectional shape so that the chip-breaker grooves 66 to be formed are rectangular. Further, the grooving teeth 68 may be formed so as to cut chip-breaker grooves in the form of slits having a small width.

Referring next to FIGS. 7-11, another embodiment of the invention will be described.

Figure 8:
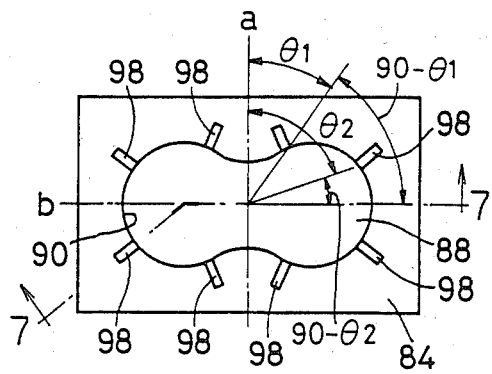
FIG. 8 is a bottom plan view of the formed broach of FIG. 7.
Figure 9:
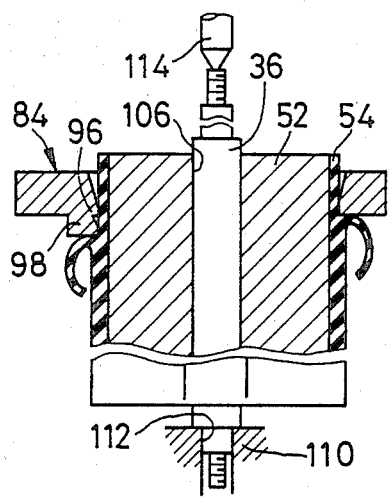
FIG. 9 is a front elevational view in cross section, showing a broaching cut on a resin layer of the rotor by the formed broach of FIG. 7.

In this embodiment, the entire periphery of the resin layer 54 of the rotor 40 is broached by a formed broach indicated generally at 84 in FIGS. 7-9. This formed broach 84 includes a generally planar rectangular body 86, which is supported by suitable support means, so as to be movable relative to the workpiece, i.e., rotor 40 (42) in the direction parallel to the axis of rotation of the rotor 40, for broachiing the outer peripheral surface of the resin layer 54 of the rotor 40. The body 86 has an aperture 88 formed in its central portion through its thickness. The aperture 88 has a profile similar to the external cross sectional profile of the rotor 40 (42), as indicated in FIG. 8. The body 86 has a cutting edge 90 which is formed at one of opposite open ends of the aperture 88. This cutting edge 90 has a contour identical with the profile of the rotor 40 (42), and serves to finish the entire peripheral surface of the resin layer 54 in one pass of the broach 84. The aperture 88 is defined by a straight land 92 extending from the finish cutting edge 90 parallel to the centerline of the aperture 88, and a relief surface 96 which extends from the straight land 92 toward the other end of the aperture 88. The relief surface 96 is inclined so that the diameter at the above-indicated other end of the aperture 88 is larger than that of the straight land 92, as most clearly shown in FIG. 7. The cutting edge 90, straight land 92 and relief surface 94 cooperate to constitute a trailing finishing portion 96 of the broach 84, which corresponds to the trailing finish cutter 62 of the composite broach 56 of FIG. 3.

The broach 84 has eight grooving teeth 98 which extend, in the broaching direction of the broach 84, from the surface of the planar body 86 at which the finish cutting edge 90 is formed. As shown in FIG. 8, each grooving tooth 98 has a rectangular cross sectional shape, and these eight grooving teeth 98 are disposed in spaced-apart relation with each other along the profile of the cutting edge 90, such that the teeth 98 are perpendicular to the profile of the aperture 88. Each grooving tooth 98 has a relief surface 100, a straight land 102, and a cutting edge 104. The relief surface 100, which connects the surface of the body 86 and the straight land 102, is also inclinedd such that its one end is located a slight distance away from the finish cutting edge 90 toward the outer periphery of the body 86, while the other end terminates in the straight land 102. Like the straight land 92 of the finishing portion 96, the straight land 102 of the grooving tooth 98 if formed parallel to the centerline of the aperture 88, and terminates in the cutting edge 104. In the present embodiment, the straight land 102 and the cutting edge 104 of the grooving tooth 98 are aligned with the straight land 92 and the cutting edge 90 of the finishing portion 96. More specifically, a distance between the cutting edge 104 and the centerline of the aperture 88 is equal to a distance between the cutting edge 92 and the centerline of the aperture 88.

The eight grooving teeth 98 each constructed as described above constitute a trailing grooving portion of the broach 84, which is integral with the trailing finishing portion 96. The grooving portion (98) leads the finishiing portion 96 in the broaching direction when the broach 84 is moved relative to the workpiece (rotor 40, 42) for broaching the resin layer 54.

Figure 10:
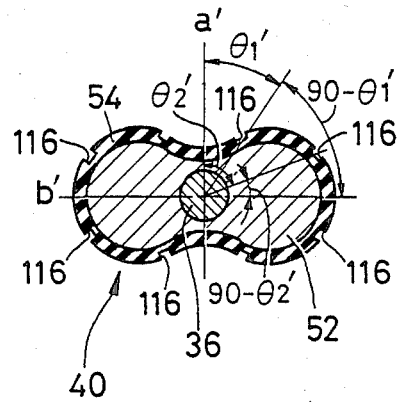
FIG. 10 is a cross sectional view illustrating chip-breaker grooves cut in the resin layer by the grooving teeth of the formed broach.

When the resin layer 54 of the rotor 40 is finished to a desired shape by the formed broach 84 constructed as described above, the previously indicated support shaft 36 is inserted through an axial bore 106 formed in the core member 52 of the rotor 40. Then, one end of the support shaft 36 is fitted in a positioning hole 112 formed in a claimping jig 110, and the other end is supported by a center 114. The center 114 is supported by the clamping jig 110 so that the center 114 is axially movable by a hydraulic cylinder to clamp the support shaft 36. Before the formed broach 84 initiates a broaching cut, its grooving teeth 98 are positioned right above the opposite end face of the resin layer 54 of the rotor 40. To effect a broaching cut, the formed broach 84 is fed downward by a suitable drive (not shown) relative to the rotor 40, in the broaching direction parallel to the axis of rotation of the rotor 40 (parallel to the axial bore 106). As a result, eight chip-breaker grooves 116 having a rectangular cross sectional shape are formed in the outer skin portion of the resin layer 54, by the respective eight leading grooving teeth 98, as indicated in FIG. 10. In this example, the four grooves 116 are formed in one of two lobes of the rotor 40, while the other four grooves 116 are formed in the other lobe of the rotor 40.

Figure 11:
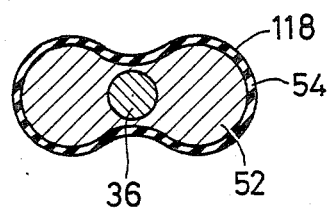
FIG. 11 is a cross sectional view showing the resin layer finished by a finishing portion of the formed broach.

Successively, the entire periphery of the resin layer 54 (except the portions in which the chip-breaker grooves 116 have been formed) is broached by the trailing finishing portion 96, whereby the resin layer 54 is given a smooth finished surface 118 (as shown in FIG. 11) whose cross sectional profile is identical with the contour of the cutting edge 90 indicated in FIG. 10. When the trailing finishing portion 96 has reached the lower end of the rotor 40 (as seen in FIG. 9), the feeding movement of the formed broach 84 is stopped to terminate the broaching pass.

In the illustrated formed broach 84, the finishing portion 96 and the grooving portion 98 are located very close to each other in the broaching direction, whereby the dimension of the broach 84 in the broaching direction can be made considerably small. Therefore, the formed broach 84 occupies comparatively small spaces above and below the rotor 40, at the start and end of its broaching movement. Consequently, the length of the center 114 engaging the support shaft 36 to support the rotor 40 can be considerably reduced, resulting in increased clamping stability of the rotor 40. Accordingly, the broaching accuracy is improved.

A further advantage of the instant formed broach 84 is derived from the integral formation of the leading grooving portion (grooving teeth) 98 with the trailing finishing portion 96, and from the alignment of the straight land 102 (cutting edge 104) with the straight land 92 (cutting edge 90). Described in more detail, the cutting edges 90, 104 (straight lands (92, 102) can be formed simultaneously as with a wire-cut electro-discharge machining, since the distance between the land 90 and the centerline of the aperture 88 is equal to that between the land 102 and the centerline of the aperture 88. Thus, the formed broach 84 is easily manufactured at a comparatively low cost.

Further, the alignment of the two cutting edges 90, 104 of the finishing and grooving portions 96, 98 permits the chip-breaker grooves 116 to be cut to a depth which is equal to an amount of stock removed by the finishing portion 96. That is, the present broach 84 substantially eliminates a possibility that the chip-breaker grooves 116 may be left as shallow recesses in the finished surface 118 of the resin layer 54. Thus, the finished surface 118 is improved in the smoothness.

Figure 12:
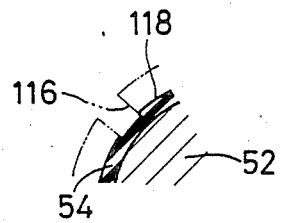
FIG. 12 is a fragmentary enlarged view showing the bottom portion of the chip-breaker groove left in the finished surface of ther resin layer.

With a view to ensuring complete breakage of chips into small segments, however, it is possible to form the grooving teeth 98 so that the depth of the chip-breaker grooves 116 is slightly larger than the amount of stock removed by the finishing portion 96, that is, the cutting edge 104 of the grooving teeth 98 is located inwardly of the cutting edge 90 of the finishing portion 96 by a predetermined small distance. In this case, the bottom portion of each chip-breaker groove 116 is left as a shallow recess in the finished surface 118 of the resin layer 54, as indicated in FIG. 12. These recesses left in the two rotors 40 and 42 of the supercharger, the recesses in one of the two rotors may meet with the recesses in the other rotor while the two rotors 40, 42 are rotated in engagement with each other during operation of the supercharger. In this event, the recesses will cause a temporary increase in the clearance or gap between the two rotors 40, 42, resulting in reduction in the volumetric efficiency of the supercharger due to leakage of the fluid through the instantaneously aligned recesses in the two rotors.

To avoid a volumetric efficiency of the supercharger due to the possibility of the recesses left in the two rotors 40, 42 meeting each other, provisions are made in the formed broach 84 according to a modified embodiment of the invention. More specifically, the grooving teeth 98 of the broach 84 may be preferably positioned with respect to the profile of the aperture 88 (finish cutting edge 90) as indicated in FIG. 8. In the figure, the profile of the aperture 88 is divided by two straight lines "a" and "b" into four components which are symmetrical with each other with respect to the center of the aperture 88. The straight line "a" passes across the minimum width of the aperture 88 (in FIG. 8). The straight line "b" is perpendicular to the straight line "a" and passes across the maximum width of the sameture 88. The eight grooving teeth 98 are arranged so that two teeth 98 are disposed for each of the four components of the profile of the aperture 88 which are defined by the two straight lines "a" and "b". The two grooving teeth 98 are positioned such that none of a first group of angles θ1 and θ2 is equal to any one of a second group of angles 90 - θ1 and 90 - θ2. θ1 is an angle formed between the straight line "a" and a straight line which passes the center of the aperture 88 and the center of one of the two grooving teeth 98. θ2 is is an angle formed between the straight line "a" and a straight line which passes the center of the aperture 88 and the center of the other grooving tooth 98. Similarly, 90 - θ1 and 90 - θ2 are angles formed between the straight line "b" and straight lines which pass the center of the aperture 88 and the centers of the two grooving teeth 98, respectively. In this modified embodiment, the cutting edge 104 of each grooving tooth 98 is located by a small distance inwardly of the finish cutting edge 90, as previously indicated.

With the grooving teeth 98 positioned as described above, the chip-breaker grooves 116 formed in the resin layer 54 of the rotor 40 by these grooving teeth 98 are similarly positioned. Namely, the rotor 40 consists of a pair of lobes which are symmetrical with each other with respect to the axis of rotation. Each lobe has an external cross sectional profile which consists of two symmetrical curved components defined by two mutually perpendicular straight lines "a'" and "b'" as indicated in FIG. 10. These lines "a'" and "b'" correspond to the straight lines "a" and "b" of FIG. 8. The two chip-breaker grooves 116 formed in each curved component of each lobe of the rotor 40 are positioned such that none of a first group of angles θ1' and θ2' is equal to any one of a second group of angles 90 - θ1' and 90 - θ2'. θ1' is an angle formed between the straight line "a'" and a straight line which passes the axis of rotation of the rotor 40 and the center of one of the two grooves 116, and θ2' is an angle formed between the straight line "a'" and a straight line which passes the axis of rotation of the rotor 40 and the center of the other of the two grooves 116. Similarly, 90 - θ1' and 90 - θ2' are angles formed between the straight line "b'" and straight lines which pass the axis of the rotor 40 and the centers of the two grooves 116, respectively.

In the supercharger whose rotors 40, 42 are broached by the modified broach 84 wherein the grooving teeth 98 are positioned as described above, the shallow recesses left in the rotor 40 will not meet the shallow recesses left in the rotor 42, while the two mutually engaging rotors 40, 42 are rotated in the opposite directions at the same angular velocity during operation of the supercharger. Described more specifically, if the two rotors 40, 42 are rotated by an angle θ from their angular positions at which the two straight lines "a'" and "b'" are in line with each other, a part of the finished surface 118 of the rotor 40 which is away from the straight line "a'" by the angle θ will engage a part of the finished surface 118 of the other rotor 42 which is away from the straight line "b'" by the same angle θ. In the present arrangement, the chip-breaker grooves 116 (shallow recesses left in the finished surfaces 118) are positioned such that none of the angles θ1' and θ2' is equal to 90 - θ1' or 90 - θ2', whereby the recesses (116) in the rotor 40 will not meet the recesses (116) in the rotor 42.

Although the chip-breaker grooves 116 are partially left in the rotors 40, 42 because the cutting edge 104 of the grooving teeth 98 are located inwardly of the finish cutting edge 90, the volumetric efficiency will not be reached due to the presence of the chip-breaker grooves 116 partially left in the finishedd surfaces 118 of the rotors 40, 42.

As shown in FIG. 10, the grooving teeth 98 are not disposed at the opposite longitudinal ends of the aperture 88, at such parts of the profile of the aperture 88 that are adjacent to the straight line "b". Therefore, the chip-breaker grooves 116 are not formed in the corresponding parts of the rotors 40, 42 which are intermittently located close to the inner surface of the housing body 28 duriing operation of the supercharger, as indicated in FIG. 2. In this sense, too, the broach 84 according to the present modified embodiment of the invention is effective in preventing reduction of the volumetric efficiency of the supercharger.

While the two different embodiments of a formed broach of the invention have been illustrated referring to FIGS. 7-12, various changes and modifications may be made in the formed broach according to the invention.

For example, while the formed broach 84 of the illustrated embodiments is adapted to broach the lobe-type rotor 40, 42 which has a pair of lobes, the principle of the invention is applicable to a broach or a broaching method for broaching a rotor which has three lobes. In this case, too, the positions of the grooving teeth (98) may be determined in the same manner as described above. Stated more specifically, the external profile of the rotor is divided into six components by three straight lines which pass the center of the axis of rotation of the rotor and the centers of the respective three lobes. The positions of the chip-breaker grooves to be formed by the grooving teeth are determined for each of these six components of the profile of the rotor.

Figure 13:
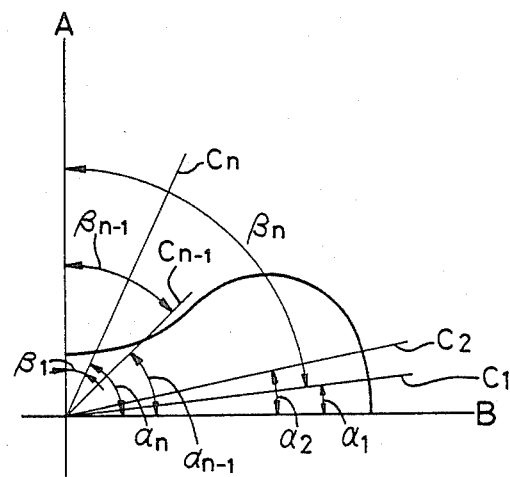
FIG. 13 is a diagram for explaining the positions of the grooving teeth of a broach constructed according to another aspect of the present invention for broaching the lobe-type rotor.

Referring to FIG. 13, the above concept of determinig the positions of the chip-breaker grooves is generalized for lobe-type rotors of a Roots type fluid machine such as a supercharger. Each lobe-type rotor has a plurality of lobes which are symmetrical with each other with respect to the axis of rotation of the rotor. Therefore, the external cross sectional profile of each lobe consists of two symmetrical curved components. Whereas, the two mutually engaging rotors are rotated in the opposite directions at the same angular velocity. In the figure, a straight line A passes the axis of rotation of the rotor and one of opposite ends of each curved component of each lobe of the rotor, while a straight line B passes the axis of the rotor and the other end of the curved component. C1 through Cn represent straight lines which pass the axis of the rotor and the respective chip-breaker grooves. α1 through αn represent angles formed between the straight line B, and the respective straight lines C1 through Cn, while β1 through βn represent angles formed between the straight line A and the resective straight lines C1-Cn. In order to satisfy the principle of the present invention, none of a first group of angles which consists of α1 through αn is equal to any one of a second group of angles which consists of β1 through βn.

While the leading grooving portion 98 of the illustrated formed broach 84 is formed integrally with the trailing finishing portion 96, it is possible that the grooving and finishing portions may be provided on two separate generally planar bodies, whch are firmly secured to each other as a substantially one-piece member such that the two portions are located adjacent to each other.

Although the illustrated one-piece formed broach 84 is adapted for broaching the entire periphery of the resin layer 54 of the rotor 40, the broach 84 may be modified for broaching a part of the entire periphery of the resin layer 54, as the composite broach unit 56 of the previous embodiment of FIG. 3. In this case, two or more different broaches are used to cover the entire periphery of the resin layer 54. Further, the concept of determining the positions of the grooving teeth 98 is applicable to a composite broach unit such as the broach unit 56 of FIG. 3, wherein an leasing preliminary grooving cutter and a trailing finish cutter are mounted on a separate member such as the slide 58 of FIG. 3. Since this latter arrangement tends to have a comparatively large error in the positioning of the grooving cutter relative to the finish cutter, there exists a comparatively high tendency that chip-breaker grooves are partially left in the finished surface of the resin layer. For this reason, the previously described concept of determining the positions of the grooving teeth is particularly effective to the composite broach unit 56 or the like.

Although a total of eight chip-breaker grooves 116 are cut by the respective eight grooving teeth 98, the principle of the invention may be practiced, provided that at least one chip-breaker groove is cut in the outer peripheral surface of the resin layer 54, and provided that the position of each chip-breaker groove is determined as previously described.

It will be understood that various other changes, modifications and improvements may be made in the invention, without departing from the spirit and scope of the invention defined in the appended claims.

What is claimed is:

1. A broaching method for finishing an outer peripheral surface of a resin layer of a resin-coated lobe-type rotor for a rotary fluid machine of a Roots type, comprising the steps of:

forming, with a leading preliminary cutter, at least one chip-breaker groove in the outer peripheral surface of the resin layer, such that said at least one chip-breaker groove extends in a broaching direction parallel to an axis of rotation of said rotor; and finishing, with a trailing finish cutter, at least a portion of the outer peripheral surface of said resin layer which corresponds to a part of an entire periphery of said rotor and which has said at least one chip-breaker groove, said finish cutter having a cutting edge contour corresponding to said part of the entire periphery of said rotor, said portion of said outer peripheral surface of said resin layer being finished by said finish cutter after said at least one chip-breaker groove is formed therein by said preliminary cutter.

2. A broaching method according to claim 1, which further comprises concurrently feeding said preliminary and finish cutters in said broaching direction in spaced-apart relation with each other in said broaching direction.

3. A broaching method according to claim 2, which further comprises concurrently feeding said preliminary and finish cutters by moving a slide on which said cutters are mounted such that said preliminary cutter leads said finish cutter in said broaching direction.

4. A broaching method according to claim 1, which further comprises forming said at least one chip-breaker groove by at least one corresponding grooving tooth formed in said preliminary cutter.

5. A broaching method according to claim 1, wherein the step of forming at least one chip-breaker groove further comprises forming a plurality of spaced apart grooves in a direction along the periphery of said rotor.

6. A broaching method according to claim 1, wherein said step of forming said at least one chip-breaker groove further comprises forming a V-shaped groove in transverse cross section.

7. A broaching method according to claim 1, wherein said step of forming said at least one chip-breaker groove further comprises forming a groove with a depth substantially equal to an amount of stock removed by said finish cutter.

* * * * *